Jan. 16, 1923.
B. T. WILSON.
ATTACHMENT FOR TRACTOR PLOWS.
FILED MAR. 1, 1922.
1,442,504
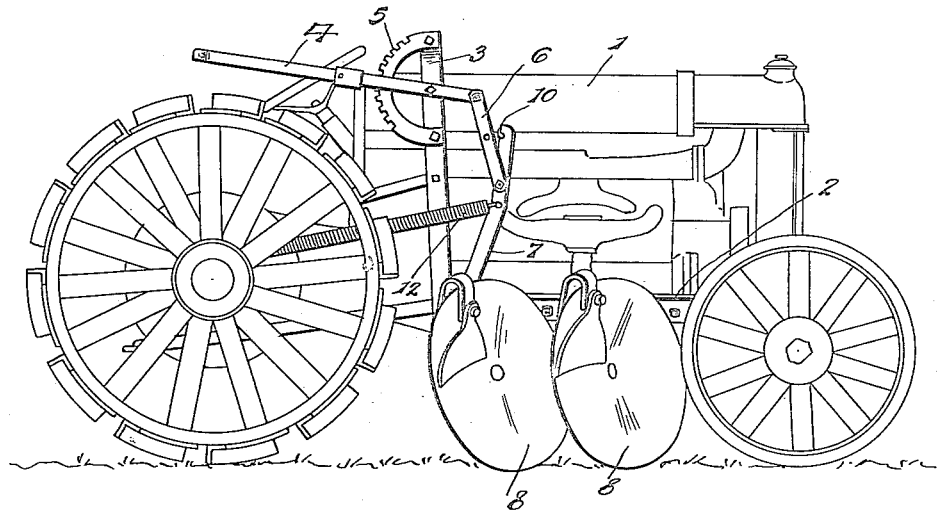
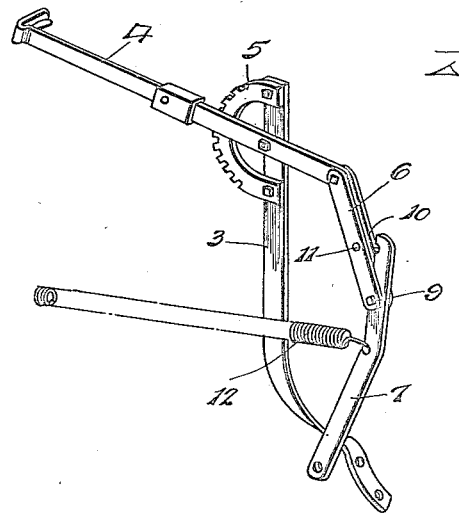
Inventor
Ben T. Wilson.
By
Lacey & Lacey, Attorneys Patented Jan. 16, 1923.

1,442,504

UNITED STATES PATENT OFFICE.

BEN T. WILSON, OF NACOGDOCHES, TEXAS.

ATTACHMENT FOR TRACTOR PLOWS.

Application filed March 1, 1922. Serial No. 540,353.

*To all whom it may concern:*

Be it known that I, BEN T. WILSON, a citizen of the United States, residing at Nacogdoches, in the county of Nacogdoches and State of Texas, have invented certain new and useful Improvements in Attachments for Tractor Plows, of which the following is a specification.

There has recently come into use a plow attachment for tractors which is mounted directly upon the side of the tractor and which, when at work, travels immediately in advance of one of the driving tractor wheels, one of the front wheels of the tractor being mounted upon an extension of the axle so as to run in a previously formed furrow and thereby aid in guiding the machine while forming a second furrow or series of furrows. This implement has proven very successful, but it depends entirely upon the weight of the plow disks or blades and the mountings of the same to hold the plows to their work while permitting them to rise over large obstructions. It has been found, however, that, when working in very hard ground or ground upon which there is a thick growth of vegetation, the resistance offered to the passage of the plows through the ground is more than the weight of the plows normally overcomes so that the plows tend to rise out of the ground and ride only upon the surface of the same. It is the object of my present invention to provide means which may be applied to the machine at a low cost, which will yield to any sudden increase of resistance, such as may be due to the impact of the plows upon a large rock or tough root, but will quickly return the plows to their work when the obstruction has been passed, and will tend to hold them constantly in the ground. This object I attain by the use of such a device as is illustrated in the accompanying drawing, and the invention resides in certain novel features which will be particularly pointed out in the appended claim.

In the annexed drawing—

Figure 1 is a side elevation of a tractor and plow carried thereby having one embodiment of my invention applied thereto;

Fig. 2 is an enlarged detail perspective view showing the application of my improvements.

In the drawing, the reference numeral 1 indicates a tractor of a well-known type now very extensively employed upon farms. 2 designates a bar which is mounted at its front end upon the front axle of the tractor and at its rear end upon a frame bar supported rigidly by the tractor draw bar and the tractor crank case, while 3 indicates a standard rising from said frame bar at the point of support of the same on the crank case. Pivotally mounted upon the standard 3, near the upper end thereof, is a hand lever 4 which is equipped with a suitable latch to co-operate with a rack 5 carried by the standard whereby the lever may be held in a set position. To the front end of the lever 4 are pivoted a pair of links 6 and between the lower ends of said links is pivoted a lever or link 7, the links or levers constituting a toggle, the lower end of which is pivoted to the mounting or bracket which carries the rear plow 8, the mountings for both plows being secured rigidly to and projecting rearwardly from the main bar 2 which may rock about its own longitudinal axis. The lower link 7 is extended above the pivotal connection 9 and is equipped with a notch 10 in its rear edge adapted to normally engage a bolt or pin 11 through the upper links whereby the links will be held in the proper alinement to hold the plows to the work. When the plows strike an obstruction, the notch 10 readily moves away from the stud 11 so that the tractor may continue its travel without interruption but the plows 8 will be permitted to swing relatively upwardly so as to clear the obstruction. As now built, the machine depends entirely upon the weight of the plows 8 and their mountings to hold the plows to their work, but, as stated, this has been found to be inefficient. In order to insure a quick return of the plows to the working position after the obstruction has been cleared, I provide a strong coiled spring 12 which is attached at its front end to the lever 7 below the pivot 9 thereof, the rear end of the spring being secured to any fixed part of the tractor or of the plow equipment. In the present illustration, the rear end of the spring 12 is secured to the rear axle housing of the tractor but it may be secured to any other fixed part.

It will be readily understood that the spring 12 is normally contracted so that it exerts a constant pull upon the link 7 to hold the same close to the standard 3 and in substantial vertical alinement with the upper links 6, the plow blades or shares being thus held firmly to their work. When an obstruction is encountered, however, the increased strain put upon the plows will overcome the tension of the spring and will expand the same, the plows swinging upwardly and the two links breaking joint, as shown in Fig. 2. As soon as the obstruction has been passed, the spring contracts and immediately returns the links to their elongated relation so that the plows will be lowered to again enter the ground. My device may be readily applied to any of the implements now in use at a very low cost and will be found highly efficient for the purpose for which it is designed.

Having thus described the invention, what is claimed as new is:

In an agricultural implement, the combination of a tractor, a rigid frame member mounted on the side of the tractor, a plow unit mounted on the side of the tractor, a lever fulcrumed on said frame member, an upper toggle link pivoted to and depending from said lever, a lower toggle link pivotally connected to and extending upwardly from the plow unit and pivoted between its ends to the lower end of the upper toggle link, interengaging holding means on the upper end of the lower link and intermediate the ends of the upper link, and a contractile spring attached at its front end to the toggle and at its rear end to a fixed member.

In testimony whereof I affix my signature.

BEN T. WILSON. [L. S.]